United States Patent
Porter et al.

(10) Patent No.: US 6,837,265 B2
(45) Date of Patent: Jan. 4, 2005

(54) ONE WAY ANTI-BACK FLOW VALVE

(75) Inventors: Stephen P. Porter, Almont, MI (US); Andrew L. Patrius, Jr., Attica, MI (US)

(73) Assignee: Ligon Brothers Manufacturing Co., Almont, MI (US)

(*) Notice: Subject to any disclaimer, the term of this patent is extended or adjusted under 35 U.S.C. 154(b) by 0 days.

(21) Appl. No.: 10/100,196

(22) Filed: Mar. 18, 2002

(65) Prior Publication Data

US 2002/0148507 A1 Oct. 17, 2002

Related U.S. Application Data

(63) Continuation-in-part of application No. 09/578,773, filed on May 25, 2000, now Pat. No. 6,357,473
(60) Provisional application No. 60/136,469, filed on May 28, 1999.

(51) Int. Cl.[7] .............................................. F16K 15/16
(52) U.S. Cl. .................................. 137/512.15; 137/855
(58) Field of Search ........................ 137/512.1, 512.15, 137/852, 854, 855, 856; 454/162, 163, 164

(56) References Cited

U.S. PATENT DOCUMENTS

| | | | |
|---|---|---|---|
| 83,549 A | 10/1868 | Reynolds | |
| 249,557 A | 11/1881 | Truesdell | |
| 1,306,391 A | 6/1919 | Romanoff | |
| 1,438,161 A | * 12/1922 | Zimmerman | ............. 137/512.1 |
| 3,191,618 A | 6/1965 | McKim | |
| 3,274,915 A | 9/1966 | Ziegenfelder | |
| 3,286,617 A | 11/1966 | Shirk | |
| 3,391,628 A | 7/1968 | Ziegenfelder | |
| 4,668,172 A | * 5/1987 | Shibuya et al. | ......... 137/512.15 |
| 4,838,262 A | 6/1989 | Katz | ..................... 128/205.24 |
| 4,934,362 A | 6/1990 | Braun | ..................... 128/207.12 |
| 4,972,765 A | 11/1990 | Dixon | ........................ 98/2.18 |
| 5,194,038 A | 3/1993 | Klomhaus et al. | .......... 454/162 |
| 5,325,892 A | 7/1994 | Japuntich et al. | ........... 137/855 |
| 5,492,505 A | 2/1996 | Bell et al. | .................... 454/162 |
| 5,687,767 A | 11/1997 | Bowers | ..................... 137/855 |
| 5,695,397 A | 12/1997 | Frank et al. | ................. 454/164 |
| 5,727,999 A | 3/1998 | Lewis | ........................ 454/162 |
| 5,779,536 A | 7/1998 | McCorkel et al. | .......... 454/137 |
| 5,794,654 A | * 8/1998 | Marvonek et al. | ..... 137/512.15 |
| 5,803,122 A | 9/1998 | Theilmeier | .................. 137/854 |
| 5,904,618 A | 5/1999 | Lewis | ........................ 454/162 |
| 6,026,852 A | 2/2000 | Barton et al. | .......... 137/512.15 |
| 6,047,698 A | 4/2000 | Magidson et al. | ..... 128/207.12 |
| 6,132,308 A | * 10/2000 | Dietz et al. | ................. 454/162 |

* cited by examiner

Primary Examiner—David A. Scherbel
Assistant Examiner—Ramesh Krishnamurthy
(74) Attorney, Agent, or Firm—Dykema Gossett PLLC

(57) ABSTRACT

A one-way valve includes a plate and a flexible vane. The plate has a vent opening of a first size and shape. The plate has a first curvature. The flexible vane has a second curvature distinct from the first curvature. The vane is fixed to the plate in a manner facilitating the deflection of the vane between an open position and a closed position. The vane is in a bent condition in the closed position. The vane conforms to the first curvature of the plate over the vent opening, and covers the vent opening in the closed position. The vane is elastic throughout a range of deflection associated with the vane moving between the closed position and the open position.

43 Claims, 8 Drawing Sheets

ONE WAY ANTI-BACK FLOW VALVE

RELATED APPLICATIONS

This application is a continuation-in-part (CIP) of U.S. application Ser. No. 09/578,773 filed May 25, 2000 entitled ONE WAY ANTI-BACKFLOW VALVE, now U.S. Pat. No. 6,357,473, which claims the benefit of provisional application Ser. No. 60/136,469 filed May 28, 1999, hereby incorporated by reference in its entirety.

FIELD OF THE INVENTION

The invention relates generally to one-way anti-back flow valves.

BACKGROUND OF THE INVENTION

One-way or anti-back flow valves are used in many different applications and have many different forms. One such application is as a valve for preventing the back flow of air into passenger vehicle cabins. The valve both seals the cabin against the entry of poisonous fumes and the like, and vents the cabin to prevent or relieve an undesired increase of pressure therein. Such pressure increases can be caused by the operation of the heating, ventilating and air conditioning system, or by the slamming of a door of a vehicle when all of the windows are rolled up. Valves designed to serve as cabin air exhausters must both seal against back pressure, permitting very little air to leak into the cabin, and must open at very low cabin pressure to prevent or quickly reduce any significant increase in cabin pressure. Standards for acceptable flow rates are established by automotive companies.

Cabin air exhausters are typically spring or gravity operated flapper valves, with the flapper being formed of a relative soft rubber or rubber-like material. The flappers are hinged along a top edge in some manner, and hang vertically responsive to gravity. Back pressure tends to force the flappers against the supporting plate. Elevated cabin pressure pushes the flapper away from the plate, allowing cabin air to escape. One problem with such valves is that the desired level of sealing is difficult to consistently achieve. A limitation of valves relying exclusively on gravity to close is that gravity biased valves are sensitive to orientation. The valves must typically be oriented in an upright position on a vertical surface to operate. Another concern is that the flapper may flutter, creating undesired noise when open when air is passing through at a high rate of flow. If a spring is used to provide a more positive closing of the flapper than is possible with gravity, the cabin pressure needed to initiate exhausting will be undesirably increased.

Another common application of one-way or anti-backflow valves is as an exhalation valve for a filter mask. The term "Filter Mask" is meant to describe a device adapted to be worn over the nose and mouth. These filter masks utilize filter material for the removal of unwanted components from the inspired air. One-way valves used in filter masks allow for a relatively unrestricted flow of exhalate out of the mask, while preventing intake under certain conditions. The one-way valves open under the pressure differential upon exhalation of the user. Typical valves in filter masks are of the type which only ensures sealing when in an upright orientation.

It is desired to provide a one way valve which seals effectively against back flow from a first side while opening at relatively low positive pressures on the second side independent of orientation.

SUMMARY OF THE INVENTION

A one-way valve includes a plate and a flexible vane. The plate has a vent opening of a first size and shape and a first curvature. The vane has a second curvature that is distinct from the first curvature. The vane is fixed to the plate in a manner that facilitates the movement of the vane between an open position and a closed position. The vane is in a bent condition in the closed position. The vane conforms to the first curvature of the plate over the vent opening and covers the vent opening when in the closed position. The vane is elastic throughout a range of deflection associated with the vane moving between the closed position and the open position. At least one of the first curvature and the second curvature has an axis of curvature about which the one curvature is formed. A hinge is disposed on a side of the vane and fixes the vane to the plate, enabling pivoting between the open position and the closed position about a hinge axis that is normal to the axis of curvature. In another embodiment, the vane is fixed to the plate by two tabs that extend from a side of the vane. The first curvature is substantially parallel to an axis of curvature and a line through the tabs is approximately normal to the axis of curvature. The vane has a first dimension in a first direction that is normal to the axis of curvature and has a second dimension in a second direction that is parallel to the axis of curvature. The first dimension is larger than the second dimension. The tabs are disposed at least as close to the ends of the vane as to each other. The tabs are formed integral and unitary with the vane and form a living hinge about which the vane pivots between the open position and the closed position. The tabs are sufficiently stiff to resist deflection at a first pressure level. The first curvature may be substantially parallel to an axis of curvature. The tabs may be slidably held against the plate by a restraining feature which permits the tabs to remain in engagement with the plate relative to the thermal contraction and expansion of the vane relative to the plate. Alternatively, the tabs may be fixed to the plate. In a different embodiment, the plate has a first variable curvature and the vane has a second variable curvature. The vane is fixed to the plate by two tabs that extend from a side of the vane and is not elastic throughout a range of deflection. The tabs deflect and the vane pivots about a hinge axis to the open position responsive to a second pressure level. In another embodiment, two tabs extend from the side of the vane and one of the tabs is fixed to the plate. The second tab is displaceable relative to the plate and permits the vane to remain in engagement with the plate with the relative thermal contraction and expansion of the vane relative to the plate. In yet another embodiment, two tabs extend from the side of the vane and both tabs are slidably held against the plate by a restraining feature that allows displacement of the vane relative to the plate. The restraining feature permits the vane to remain in engagement with the plate with the relative thermal contraction and expansion of the vane relative to the plate.

A one-way valve includes a plate having a first vent opening of a first size and shape and a second vent opening of a second size and shape. The plate has a first curvature. The valve includes a first flexible vane that is disposed over the first vent opening and a second flexible vane that is disposed over the second vent opening. The vanes have a second curvature that Is distinct from the first curvature. The first vane has first tabs that extend from a side of the first vane and the second vane has second tabs that extend from a side of the second vane. The first tabs are formed integral and unitary with the second tabs. The vanes are fixed to the plate by the first tabs and the second tabs connected to a portion of the plate that is intermediate both of the vent openings. The tabs are disposed at least as close to ends of the first and second vanes as to each other. The first and second vanes are in a bent condition in the closed position. The first vane covers the first vent opening in the closed position and the second vane covers the second vent opening in the closed position. The vanes conform to the first curvature of the plate over the vent openings and cover the vent openings in the closed position. The vanes are elastic throughout a range of deflection between the closed position and the open position. The tabs are integral and unitary with the vanes and act as a living hinge about which the vanes pivot between the open position and the closed position. The tabs are sufficiently stiff to resist deflection at a first pressure level.

A one-way valve includes a plate with a vent opening of a first size and shape. The valve also includes a flexible vane that has a second size and shape. The vane has a substantially flat shape in a free state. The vane covers the vent opening in the closed position. The vane is sufficiently flexible such that it conforms to the curvature of the plate in a closed position. The vane is sufficiently stiff to develop a desired sealing load when forced to conform to the plate. A hinge in the form of a tab extends from one side of the vane and is fixed to the plate. The tab is integral and unitary with the vane and operates as a living hinge enabling pivoting of the hinge between an open position and a closed position. The tab is smaller than the length of the side of the vane to which the tab is attached. The tab and the vane have associated bending stiffnesses such that the tab deflects and a portion of the vane distal to the tab deflects away from the plate and a portion of the vane proximate to the tab remains proximate to the plate in response to a first pressure level. In another embodiment, the plate has a variable curvature. In another embodiment, the plate is concave. The vane is elastic throughout a range of deflection between the closed position and the open position. The tab resists deflection and the vane pivots about the hinge axis to the open position responsive to a second pressure level. In another embodiment the plate is convex about a center axis of curvature. The tab resists deflection responsive to a first pressure level. The tab deflects and a portion of the vane distal to the tab deflects away from the plate and a portion of the vane proximate to the tab remains proximate to the plate responsive to a second pressure level.

In any of the above embodiments, the valve may have the following additional characteristics. The vane may be formed of a material that has a coefficient of thermal expansion substantially equal to the coefficient of thermal expansion of the plate. The vane may be fixed to the plate by a tab serving as the hinge and extending from a side of the vane where the tab functions as a living hinge and the tab is slidably held against the plate by a restraining feature, or the tab may be fixed to the plate. The tab may extend from a side of the vane and function as a living hinge and engage only a portion of the side of the vane from which it extends. The tab may be formed integral and unitary with the vane. Two tabs may extend from the side of the vane. The tabs and the vanes may be formed integral and unitary with each other from a single piece of material. The side of the vane from which the tabs extend may be curved to be substantially complementary to the curvature of the plate, thereby substantially preventing deflection of the vane and relying on deflection of the hinges. The associated bending stiffnesses of the vane and the tab may prevent further deflection of the vane responsive to a second pressure level greater than the first pressure level. The vane restraining feature may be located on a plurality of the sides of the vane. The vane restraining feature may be proximate to a portion of the surface of the vane on the surface side of the vane that is not in contact with the plate.

A one-way valve is provided which seals effectively against back flow from a first side while opening at relatively low positive pressures on the second side independent of orientation.

DETAILED DESCRIPTION OF PREFERRED EMBODIMENTS

Figure 1:
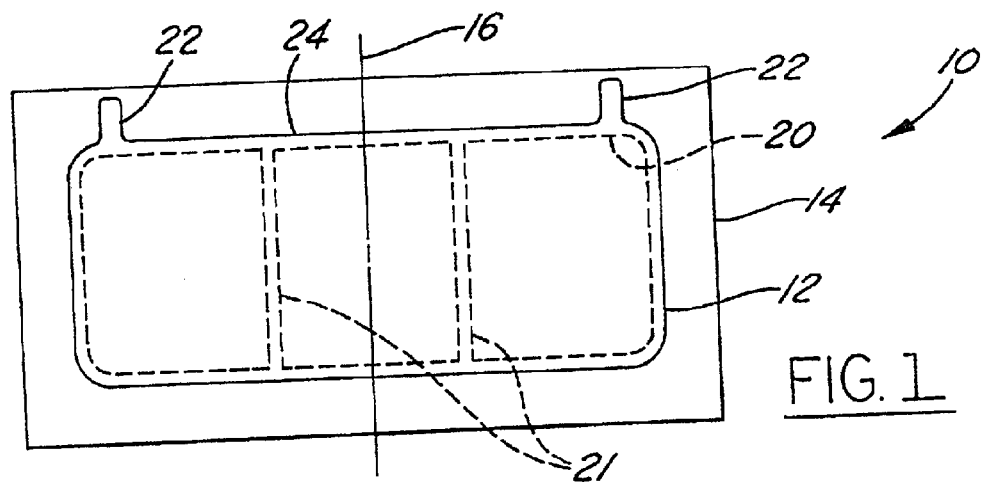
FIG. 1 is a plan view of a first embodiment of a one-way anti-backflow valve in the closed condition.
Figure 2:
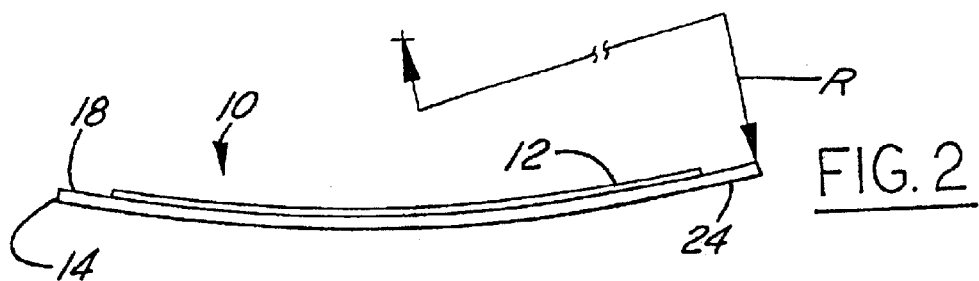
FIG. 2 is an elevational view of the valve of FIG. 1.

FIGS. 1–5 show one embodiment of an inventive valve 10. Valve 10 can be used variously as a cabin exhaust valve, a pressure relief valve, an all purpose air exhauster valve, a check valve, an anti-backflow valve, a vane valve or flapper valve.

Vane or flapper 12 is mounted to a plate 14. Plate 14 is rigid and can be formed out of any appropriate material, including steel or plastic. Vane 12 is cut from a thin sheet of material to enhance the vane's flexibility, or ability to bend. Vane 12 must be made of material sufficiently elastic so that when bent or deflected to the degree anticipated, vane 12 returns to its previous undeflected condition. Vane 12 must be formed of material that also has a sufficiently high modulus of elasticity or stiffness to generate the desired sealing loads when it is bent or bowed. Mylar® polyester film of 0.003 to 0.005 inches (0.08 to 0.13 mm) thick has been successfully employed in testing. Polycarbonate film is an alternative material for the vane. It is preferred that the film have a coefficient of thermal expansion the same or nearly the same as the material chosen for the plate. If plate 14 is formed of talc-filled polypropylene, then polycarbonate film is best suited for the vane material. If the plate is steel, polyester film is the preferred vane material because its coefficient of thermal expansion is relatively close to that of steel. For many applications, it is preferred that plate 14 be formed of a material which is paintable. It is possible to employ plate and vane materials with mismatched coefficients of thermal expansion, so long as vane 12 is connected with plate 14 by a means that accommodates the relative expansion and contraction.

It is also preferable that the vane material is temperature stabilized so that it does not distort with temperature changes. Temperature stabilization is particularly important for valves that are going to be used in applications exposing the valves to a wide range of temperatures.

Valve plate 14 is curved about an axis of curvature 16 which extends parallel to plate 14 and about which plate 14 is curved. Vane 12 is fixed to a vane side 18 of plate 14 which Is the same side on which axis 16 is disposed. Valve plate 14 has a valve opening 20 passing therethrough. Vane 12 is shaped to cover valve opening 20. Valve opening 20 may be divided by one or more support ribs 21. Ribs 21 help support vane 12 when valve 10 is subjected to back pressure, preventing vane 12 from being pushed through opening 20. The need for, the number of, and the size of, ribs 21 varies with the size of opening 20 and the stiffness of vane 12.

Figure 3:
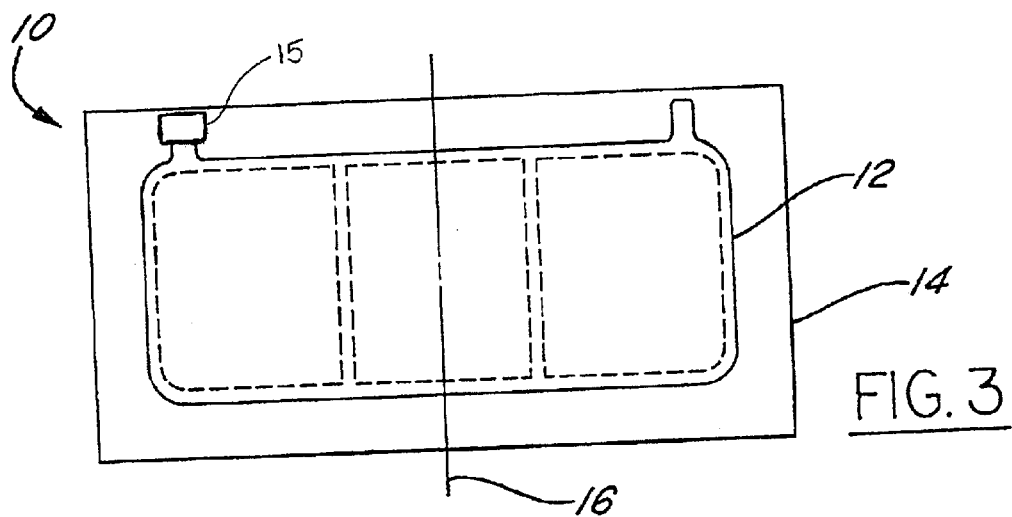
FIG. 3 is a plan view of the valve of FIG. 1 in a low pressure exhaust mode.
Figure 4:
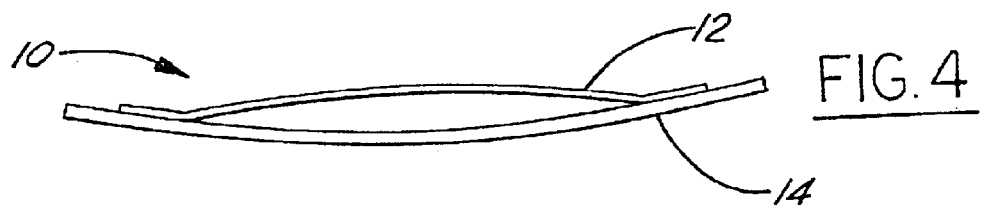
FIG. 4 is an elevational view of the valve of FIG. 3.
Figure 5:
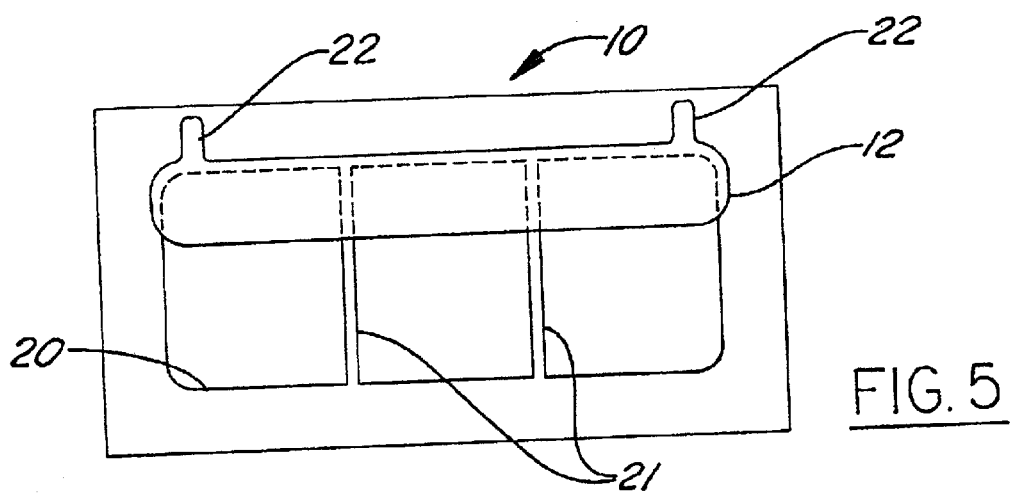
FIG. 5 is a plan view of the valve of FIG. 1 in a high pressure exhaust mode.
Figure 6:
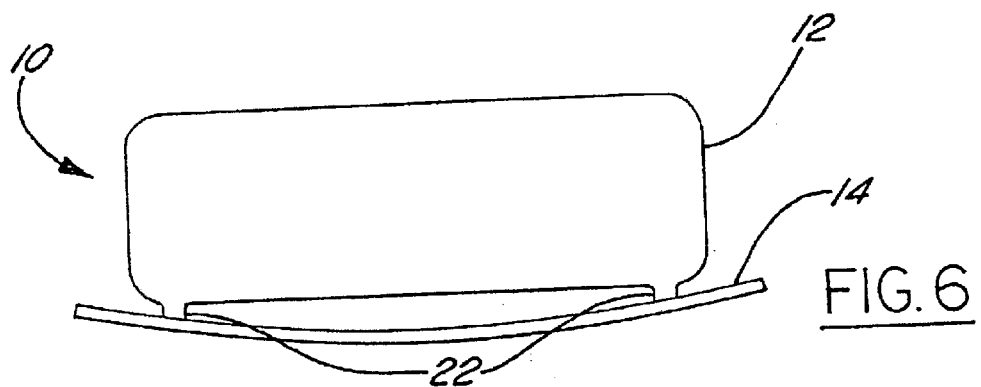
FIG. 6 is an elevational view of the valve of FIG. 5.

Vane 12 has two vane mounting tabs 22 formed from the same sheet of material as vane 12 which are fixed or bonded to valve plate 14. Samples tested have had tabs 22 adhesively bonded to the plate, but other means of retention, such as rivets, screws, or clips could be used. Tabs 22 could be heat staked to plate 14. Yet alternatively, tabs 22 could be held against plate 14 by a restraining feature such as a bracket 15 (an example is shown in FIG. 3) fixed to plate 14. Bracket 15 as shown in FIG. 3 is just one example of a restraining feature. The restraining feature may be formed to prevent tabs 22 from moving relative to plate 14. The restraining feature may be formed to slideably hold tab 22, and thus vane 12, against plate 14. Alternate configurations of the use of a restraining feature may have one tab fixed to plate with the other tab slideably held against plate, both tabs fixed to plate, or both tabs slideably held against plate. The combination of fixing the tab and slideably holding the tab against plate could vary depending on the number of tabs utilized in valve, as well as the desire to restrain movement of vane. The use of a restraining feature may be used regardless of the number of tabs in valve. The precise means of fixing vane 12 to plate 14 is not critical to the operation of valve 10. What is important to the operation of valve 10 is that tabs 22 be configured to provide adequate retention of vane 12 to plate 14, and to provide an adequate restoring force biasing vane 12 to a closed condition, and to enable the desired mode of deflection of vane 12 in a high pressure or full open condition as illustrated in FIGS. 5 and 6. In the embodiment of FIGS. 1–6, tabs 22 function as living hinges, allowing pivoting of vane 12 to the full open position responsive to an application of high pressure and providing a restoring force tending to return vane 12 to a closed position. Tabs have radii on each side of the base of tabs 22. The radii help prevent cracks from developing between tabs 22 and the rest of vane 12 after repeated cycling of vane 12 between the open and closed positions.

The size and shape of valve vane 12 and opening 20, the tab configuration, including the number and location of tabs 22, the stiffness of the vane material and a size of radius R of curvature of plate 14 all contribute to the sealing force of opposing a back pressure force directed against a back side 24 of plate 14. The concave curvature of the valve plate can be of particular benefit. If the valve plate was not curved, the vane would only cover opening 20, but would not be pressed against it. Tabs 14 would resist movement of vane 12, but would not provide any sealing force against plate 14. The sealing force attributable to the curvature of plate 14 is very important to the effectiveness of valve 10 in blocking the backflow of fluids. With plate 14 being curved, vane 12 is pressed against bowed plate 14 and induces sealing forces between vane 12 and plate 14. The spring force of vane 12 attributable to the bending strength of the vane about the axis of curvature 16 acts against the curved plate 14, inducing the sealing force of vane 12 against plate 14. Vane 12 is just slightly larger than the opening 12 in the plate, with sealing occurring between the outer periphery of vane 12 and the portion of the plate 14 overlapped by vane 12. The small overlap results in greater sealing pressure between vane 12 and plate 14 than if a large overlap is employed.

Testing has been conducted with plate 14 having radius R of 9 inches (230 mm). While FIG. 1 shows plate 14 having a single constant radius, that characteristic is not critical to the invention. Plate 14 may be generally concave on vane side 18 for valve 10 to function as intended. However, plate 14 may employ a curvature of multiple radii (FIGS. 19–21), or may even include flat portions. Valve 10 may operate adequately with the curvature being reversed or convex, as set forth in FIGS. 16 to 18. The reverse curvature must be sized and oriented to enable sealing.

The shape and location of tab 22 is important to maintaining vane 12 against plate 14 in the closed condition. Tab 22 must be stiff enough to keep vane 12 pressed against plate 14. The desired stiffness of tabs 22 may be achieved by forming tab 22 of sufficient width. Alternatively, the stiffness of tabs 22 could be increased by laminating a layer of materials to tabs 22 to increase their thickness. The necessary stiffness of tabs 22 will be a function of the stiffness or resistance to bowing of vane 12, and of the radius of curvature of plate 14. A smaller radius of curvature will require a stiffer tab to keep vane 12 pressed against the plate 14. If there are two tabs 22, with each located near the ends of vane 22, then the tabs 21 resistance to twisting as well as their resistance to bending may also be important. If tabs 22 can twist excessively, vane 12 may not be properly seated at the center in an unloaded condition.

If the curvature of vane 22 is reversed on opening, a near stable open position can be obtained, and very little force is required to maintain the open condition. It is possible to build a bi-stable valve, which remains open or closed until some force applied to the valve moves the vane to the opposite position. However, care must be taken to ensure that a bi-stable structure is not created unintentionally, lest vane 12 unintentionally become stuck in the open position.

The location of tabs 22 may influence the shape of vane 12. With tabs 22 located at the ends of vane 12, as shown, for example, in FIGS. 1–6, vane 12 can have a straight edge on a side 26 with the tabs. However, for a valve having a single tab 122 at the center of vane 112 as shown, for example, in FIGS. 7–12, it is preferable to have a curved edge on the side 126 with the tabs. The radius of the curved edge is approximately that of the curvature of plate 114 to prevent interference between the ends or corners 128 of vane 112 and the curved plate 114 when vane 114 is deflected to the fully open position. However, in some applications, it may be desirable to have the interference that would result from having the side of the vane with the tabs extend in a straight line. The resulting engagement of the corners with the plate in the open condition would provide an increased restoring force biasing the vane back toward the closed position. It should also be appreciated that single tab configurations will be less sensitive to mismatches in the coefficient of thermal expansion between vane 12 and plate 14.

Figure 7:
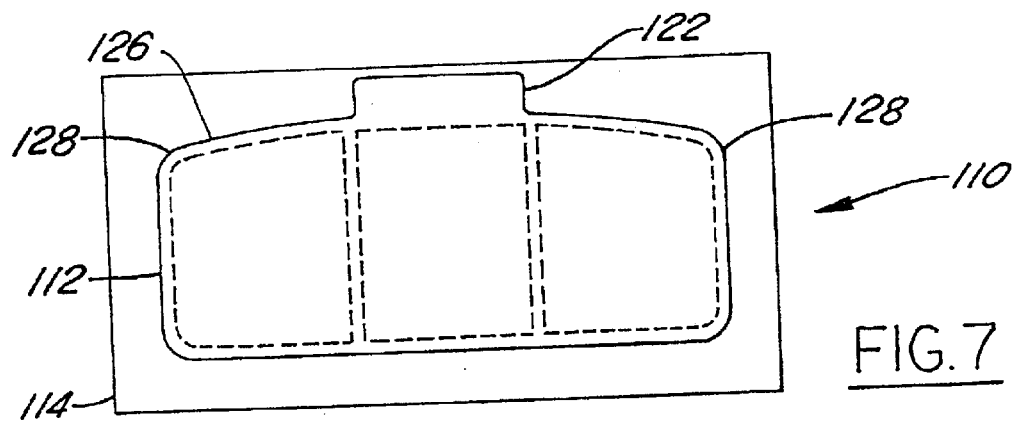
FIG. 7 is a plan view of another embodiment of a one-way anti-backflow valve in a dosed condition.
Figure 8:
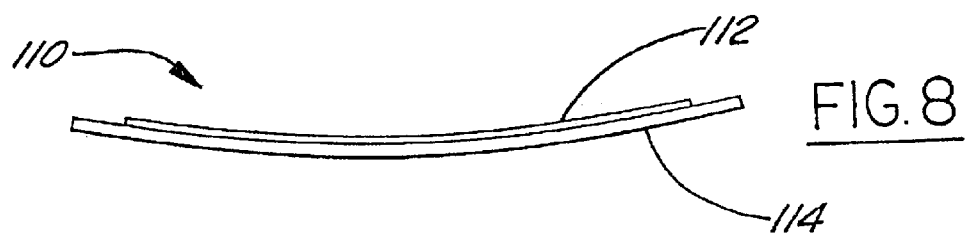
FIG. 8 is an elevational view of the valve of FIG. 7.
Figure 9:
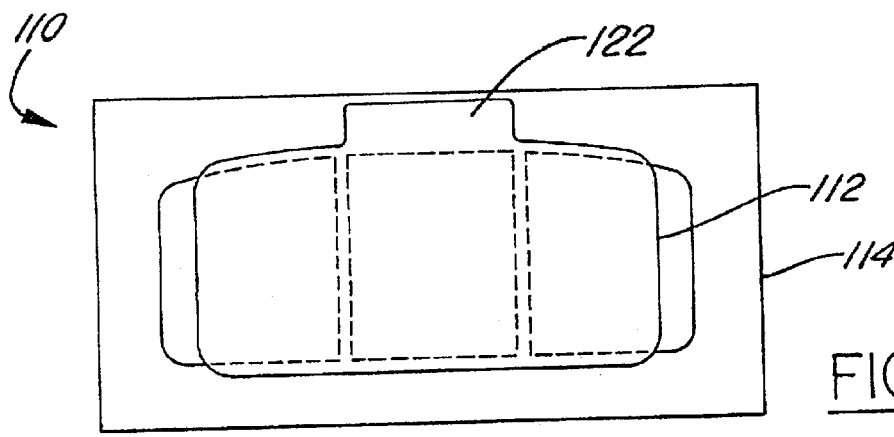
FIG. 9 is a plan view of the valve of FIG. 7 in a low-pressure exhaust mode.
Figure 10:
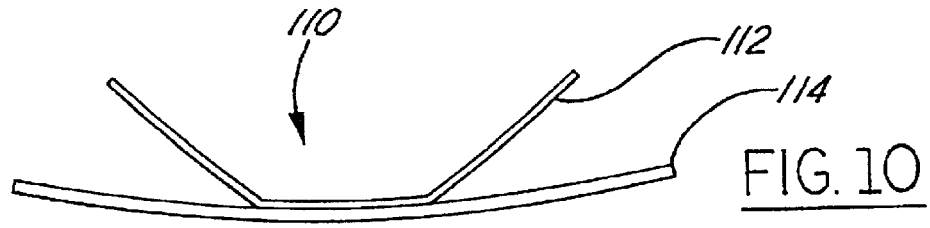
FIG. 10 is an elevational view of a valve of FIG. 9.
Figure 11:
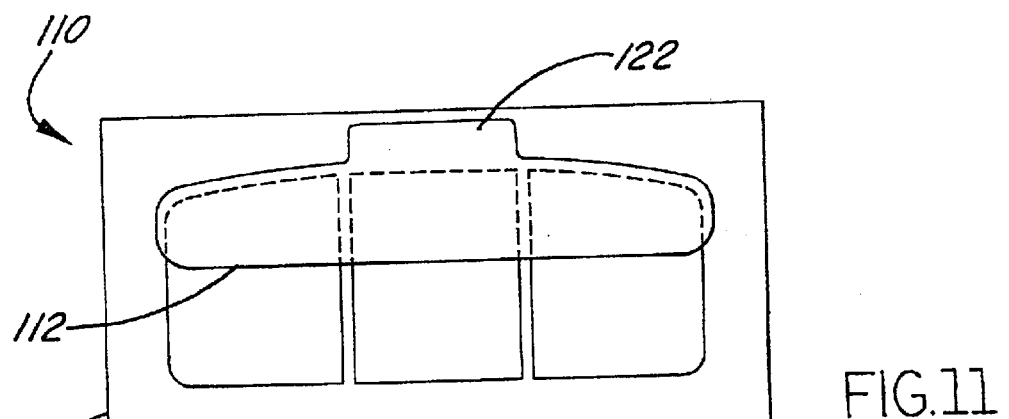
FIG. 11 is a plan view of the valve of FIG. 7 in a high-pressure exhaust mode.
Figure 12:
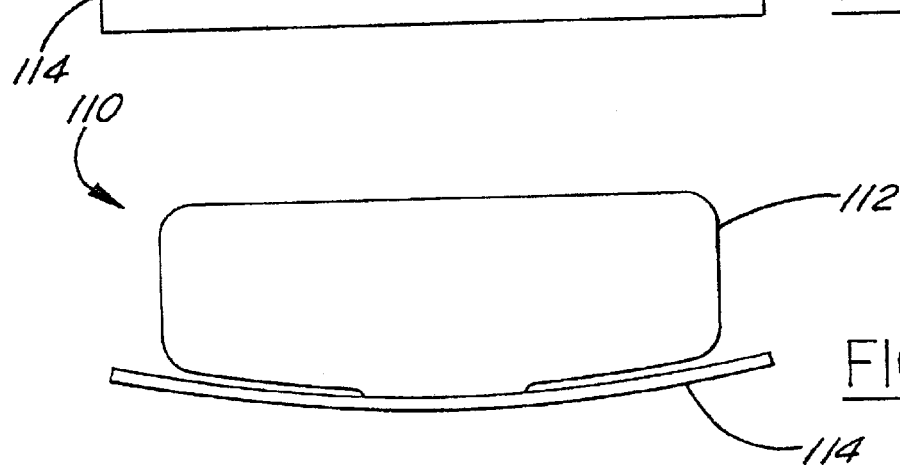
FIG. 12 is an elevational view of the valve of FIG. 11.

The embodiment of valve 110 shown in FIGS. 7 through 12 operates in a substantially identical manner to that of the embodiment of FIGS. 1 through 6. FIGS. 7 and 8 show vane 112 in a closed position against plate 114. FIGS. 9 and 10 show vane 112 deflected in a low pressure mode, with the ends of vane 112, now the parts most distal to tab 122, bowing away from plate 114. In the high pressure mode, vane 112 would assume a more nearly flat shape than vane 12, as the ends of vane 112 are free to extend outward.

Figure 13:
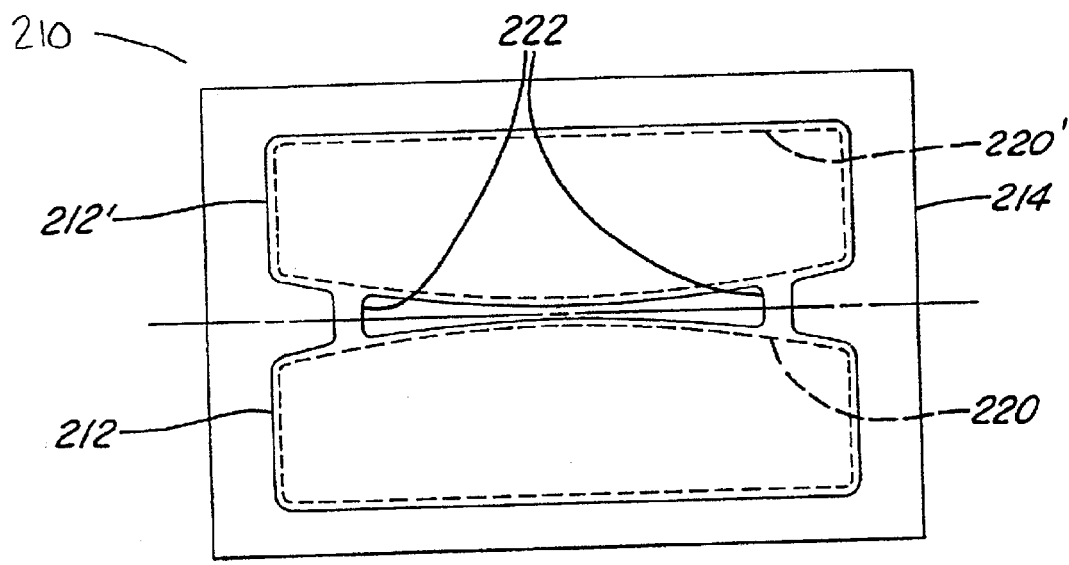
FIG. 13 is a plan view of another embodiment of a one-way anti-backflow valve in a dosed condition.
Figure 14:
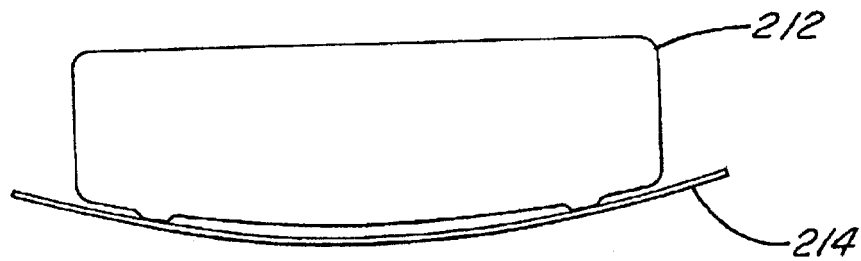
FIG. 14 is an elevational view of the valve of FIG. 13 in a high-pressure exhaust mode.
Figure 15:
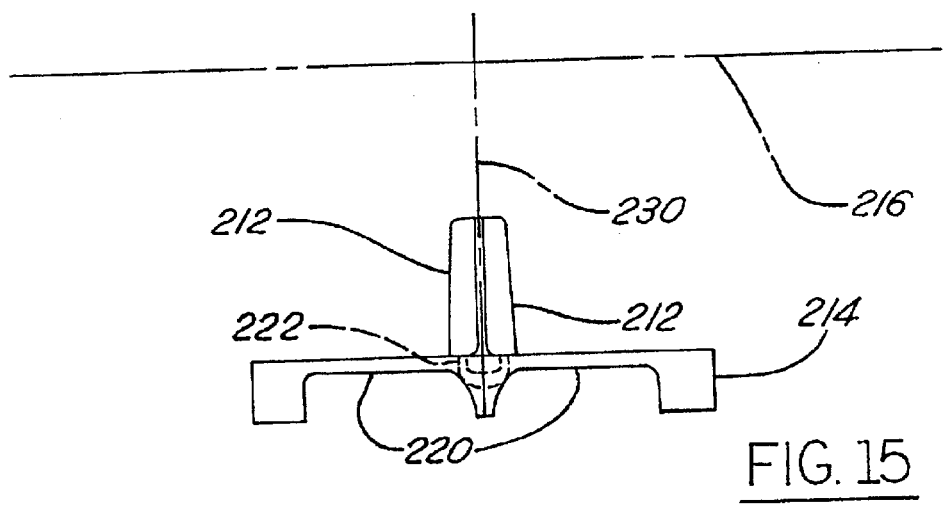
FIG. 15 is a side elevational view of the valve of FIG. 14 in the direction of arrow 15.

In the valve 210 embodiment shown in FIGS. 13–15, there are a pair of "twinned" vanes 212 and 212' joined to a plate 214 by common tabs 222. The closed position or mode is shown only in FIG. 13. Vent openings 220 and 220' and vanes 212 and 212' are shown as mirror images of each other on either side of an imaginary plane 230 separating the two sides and approximating a hinge axis. It should be appreciated that vent openings 220 and 220' and vanes 212 and 212' do not have to be mirror images of each other. Imaginary plane 230 is normal to axis of curvature 216. Tabs 222 bias vanes 212 against plate 214. The low pressure mode of deflection of each of vanes 212 is similar to that illustrated in FIGS. 3 and 4. The high pressure mode of deflection of vanes 212 is illustrated in FIGS. 14 and 15. As with vane 12, vanes 212 have reverse curvature in the high pressure mode. Vanes 212 are able to contact each other in the high pressure mode, with contact occurring at the apex of the arched vanes 212. The contact between vanes 212 and 212' enable vanes 212 and 212' to stabilize each other in the high pressure mode. The contact eliminates valve flutter which might otherwise occur.

Figure 16:
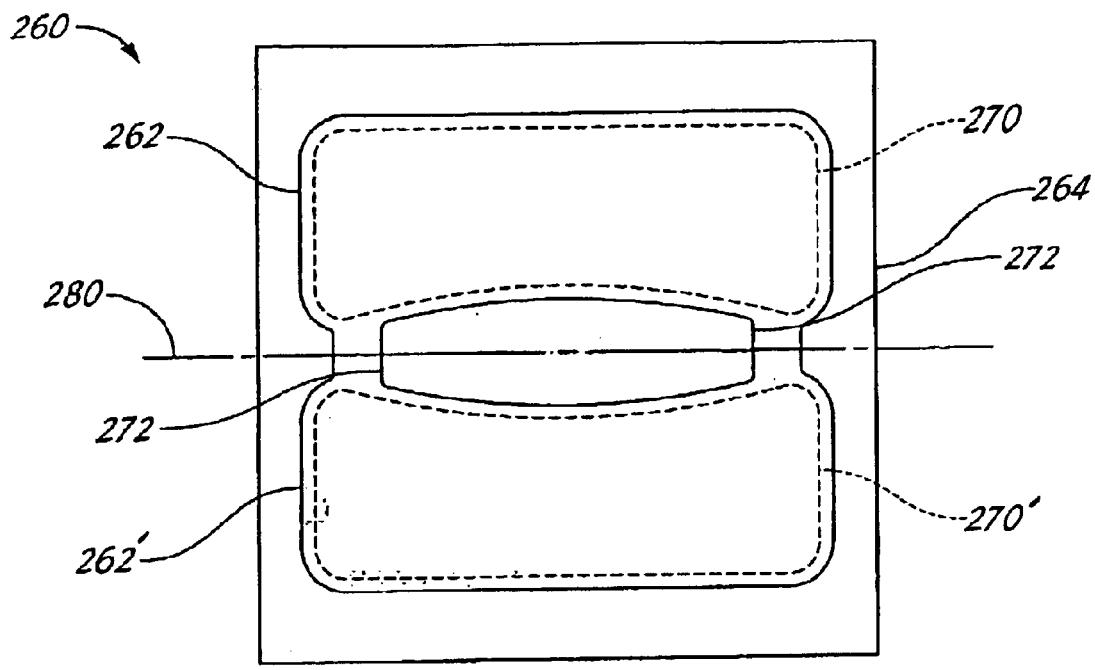
FIG. 16 is a plan view of another embodiment of a one-way anti-backflow valve in a closed condition.
Figure 17:
FIG. 17 is an elevational view of the valve of FIG. 16 in a closed condition.
Figure 18:
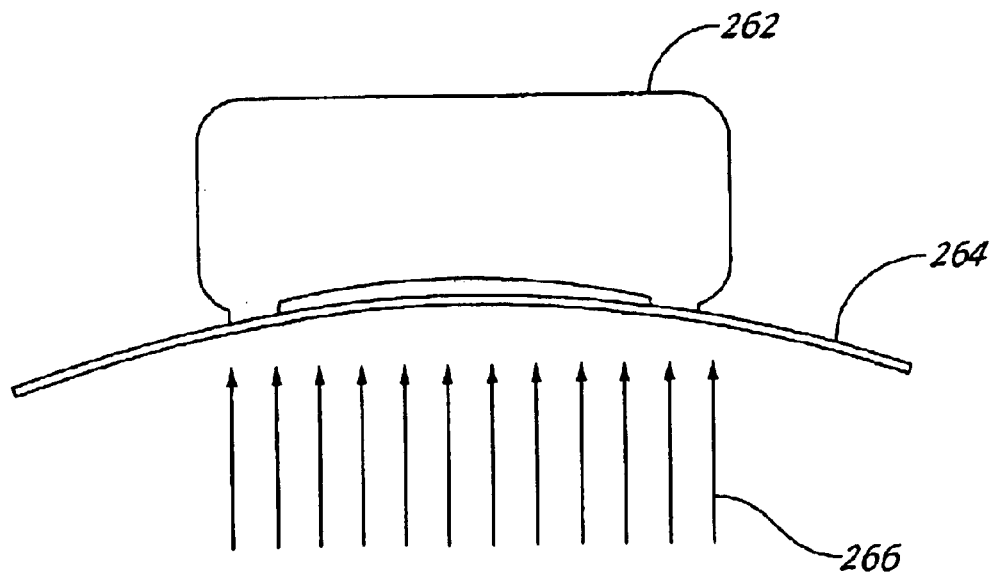
FIG. 18 is an elevational view of the valve of FIG. 16 in an open condition.

The valve 260 embodiment shown in FIGS. 16–18 has a pair of "twinned" vanes 262 and 262' joined to a plate 264 by common tabs 272. The closed position or mode is shown in FIG. 16. Vent openings 270 and 270' and vanes 262 and 262' are shown as mirror images of each other on either side of an imaginary plane 280 separating the two sides and approximating a hinge axis. It should be appreciated that vent openings 270 and 270' and vanes 262 and 262' do not have to be mirror images of each other. In this embodiment, plate 264 has a curvature that is substantially convex about the center axis of curvature. Vanes 262 and 262' maintain a substantially flat shape in a free state. Vanes 262 and 262' are sufficiently flexible to conform to the axis of curvature of plate 264 when in the closed position and to develop a sealing load when forced to conform to plate 264. Tabs 272 bias vanes 262 and 262' against plate 264. In the low pressure mode, the associate bending stiffnesses of tabs 272 and vanes 262 and 262' are such that vanes 262 and 262' resist deflection. The no pressure and low pressure stage is shown in FIG. 17. In the high pressure mode of deflection, with airflow in the direction of arrows 266, tabs 272 deflect and a portion of vanes 262 and 262' distal to tab 272 deflects from plate 262. A portion of vanes 262 and 262' remains proximate to plate 262 in response to this second pressure level.

Figure 19:
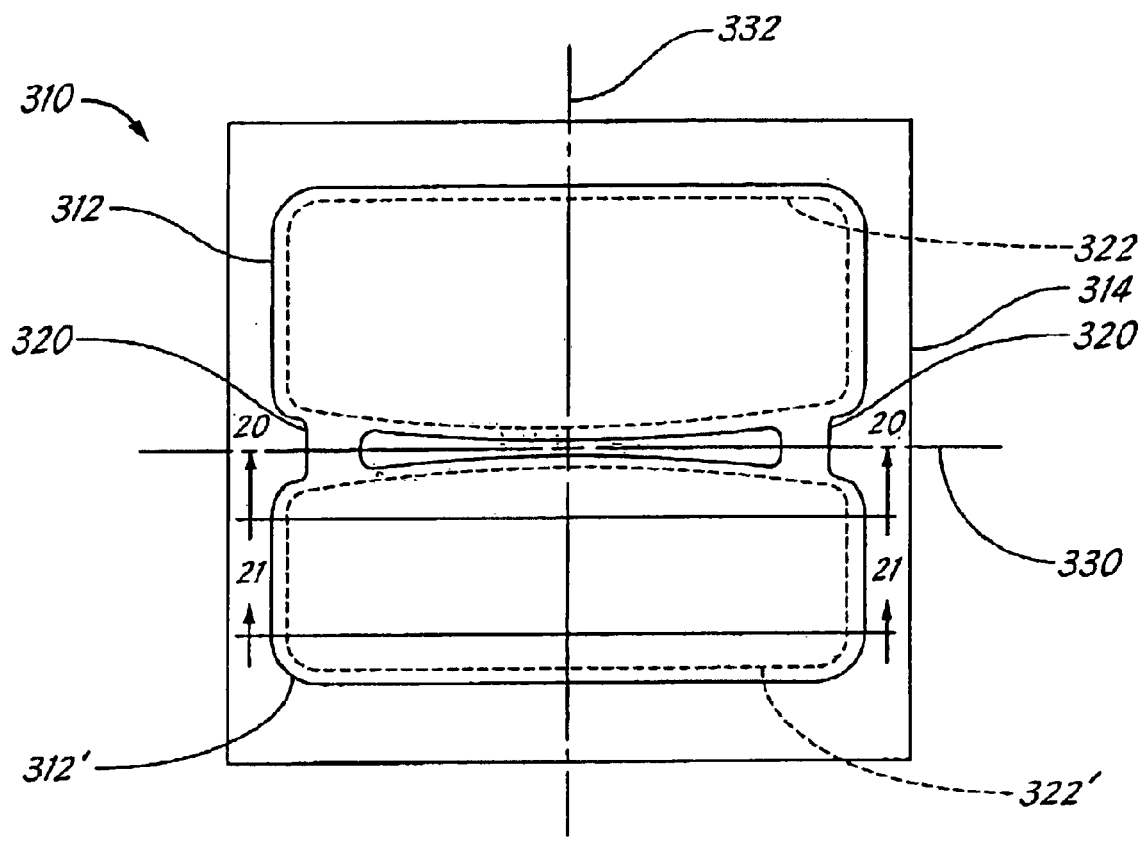
FIG. 19 is a plan view of another embodiment of a one-way anti-backflow valve in a closed condition.
Figure 20:
FIG. 20 is an elevational view of the valve of FIG. 19 in the direction of arrow 20.
Figure 21:
FIG. 21 is an elevational view of the valve of FIG. 19 in the direction of arrow 21.

The valve embodiment 310 shown in FIGS. 19–21 has a pair of "twinned" vanes 312 and 312' joined to a plate 314 by common tabs 320. The closed position or mode is shown in FIG. 19. Vent openings 322 and 322' and vanes 312 and 312' are shown as mirror images of each other on either side of an imaginary plane 280 separating the two sides and approximating a hinge axis. It should be appreciated that vent openings 322 and 322' and vanes 312 and 312' do not have to be mirror images of each other. This embodiment illustrates a variable radius of curvature of plate 314. Section 20—20, shown in FIG. 20, demonstrates a changing radius of curvature along axis 330. Section 21—21, shown in FIG. 21, demonstrates a changing radius of curvature along axis 332. It should be appreciated that the variation in curvature shown in FIGS. 20 and 21 are illustrations of one of the many possible variations that could be utilized with this inventive valve. The operation of this variable curvature embodiment of the inventive valve operates in the same manner as the embodiments explained above in reference to FIGS. 1 through 18 and in FIGS. 22 through 24.

Figure 22:
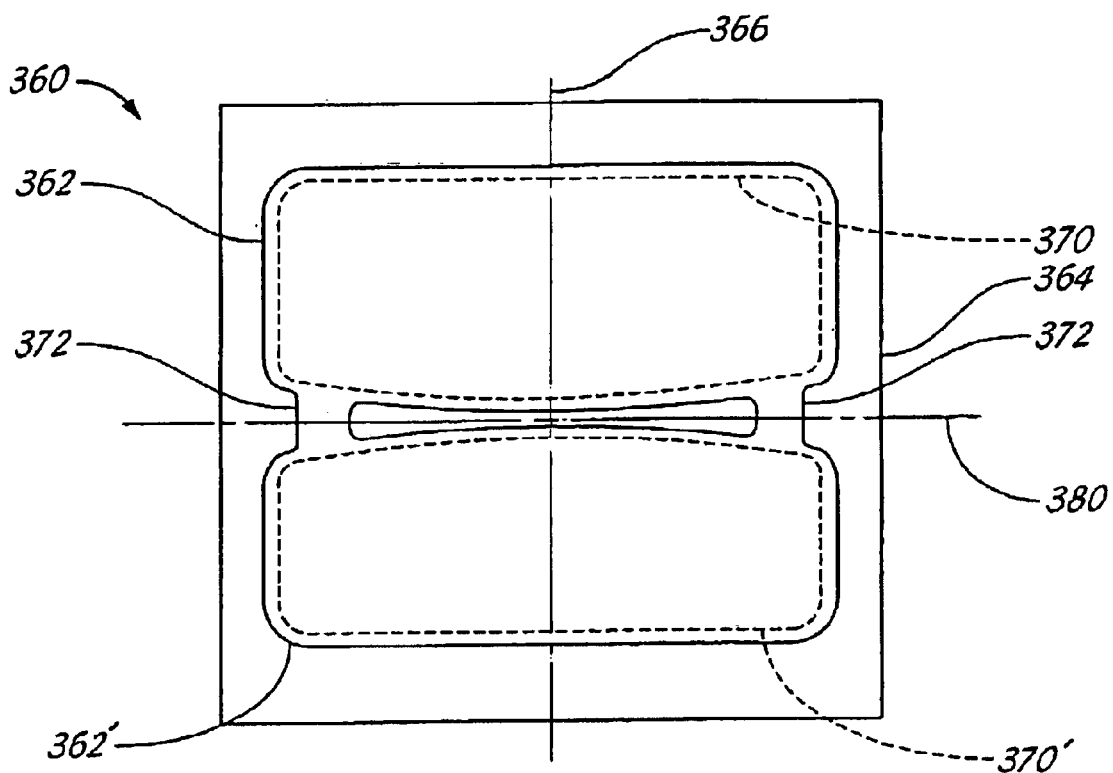
FIG. 22 is a plan view of another embodiment of a one-way anti-backflow valve in a closed condition.
Figure 23:
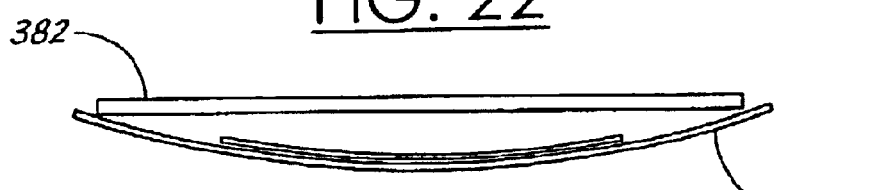
FIG. 23 is an elevational view of the valve of FIG. 22 in a closed condition.
Figure 24:
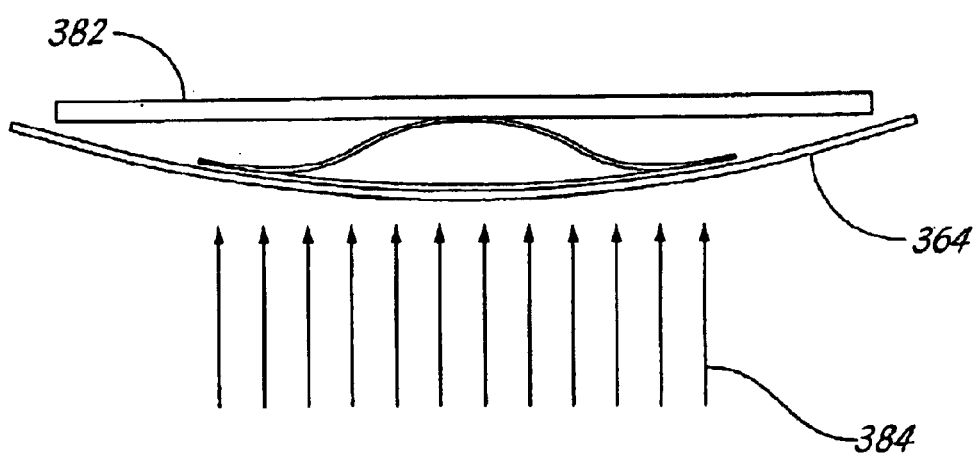
FIG. 24 is an elevational view of the valve of FIG. 22 in an open condition.

The valve 360 embodiment shown in FIGS. 22–24 has a pair of "twinned" vanes 362 and 362' joined to a plate 364 by common tabs 372. The closed position or mode is shown in FIG. 22. Vent openings 370 and 370' and vanes 362 and 362' are shown as mirror images of each other on either side of an imaginary plane 380 separating the two sides and approximating a hinge axis. It should be appreciated that vent openings 370 and 370' and vanes 362 and 362' do not have to be mirror images of each other. Imaginary plane 380 is normal to axis of curvature 366. Tabs 372 bias vanes 362 and 362' against plate 364. The low pressure mode of deflection of each of vanes 362 and 362' is similar to that illustrated in FIGS. 3 and 4 and is shown in FIG. 24. In this embodiment, a restriction mechanism 382 prevents the deflection of vanes 362 and 362' in response to the high pressure mode of deflection with air flow in the direction of arrows 384. Restriction mechanism 382 can be in the form of a bar across plate 364, as shown in FIGS. 23 and 24, or can be in any other form that prevents the deflection of vanes 362 and 362' in response to the high pressure mode of deflection. For instance, narrow bars may be attached to plate 364 and formed over vanes 362 and 362' or the restriction mechanism may not be formed integral with valve 360. Valve 360 may be placed proximate to any foreign body that would restrict the movement of vanes 362 and 362' in response to the high pressure mode of deflection.

It is anticipated that for some applications it will be desirable to form plate 14, 114, 214, 264, 314, 364 as part of a housing which would in turn be mounted to the chamber which is to be uni-directionally vented. Such housings could be designed for mounting on either an outside surface or an inside surface. The housings would preferably be provided with a means of sealing to the surface to which they are mounted. Failure to provide an adequate housing seal would result in undesired back flow into the chamber in spite of the seal provided by the vane against the plate.

The dual low pressure/high pressure exhaust mode characteristic of the valves described allows low pressure/low flow rate exhaust as may required, while also accommodating a high pressure/high flow rate event such as exhausting the cabin to account for air being pumped into the passenger cabin by the heating, ventilating and air conditioning system of the vehicle, without sacrificing the sealing capabilities of the valve. Additionally, because the vane seals by bowing against the plate, and because of the light weight of the vane, the valve can be located without regard to the orientation of the valve. This is contrasted with valves which rely on gravity for closure, or for spring loaded valves with relative heavy vanes, the sealing capabilities of which may be adversely affected by gravity.

In tests, the back flow of air past the seal of the vane against the plate was well within the test objectives. The forward flow exceeded the test objectives at pressures equal to 0.1 and 0.5 inches of water pressure. The results were the same, independent of the orientation of the valve. Testing was performed in a wind tunnel testing fixture designed for testing automotive cabin exhauster valves.

Many alternative constructions of the valve are readily apparent. Alternative configurations may employ composite vane assemblies. For example, metal vanes may be used in combination with polymer tabs or hinges. In one version of the inventive valve, a vane could be attached on opposite sides at or near the center of its associate plate so that the ends of the vane would deflect in the same mode as shown in FIG. 10. With the vane attached on two sides, it would be unable to pivot up to the high pressure mode shown in FIGS. 11 and 12. Similarly, a vane could be attached to a plate on just one end instead of at its center. However, both versions would still provide the desired sealing against back pressure, and would exhaust at relatively low pressures. Such valves may suffer from restricted high pressure flow capacity, and susceptibility to flutter of the free ends of the vane. Also, the vane need not necessarily be flat in its free condition. It could alternatively have a pre-set curvature radius greater than that of the plate, and be oriented with its concave side either facing or opposite the concave plate to achieve either higher or lower sealing loads respectively than a flat vane. If the vane has its concave side oriented toward the concave plate, the free curvature radius of the vane may be even smaller than the plate's radius of curvature. Versions of the valve employing a flat or a convex plate are also anticipated, with one such embodiment illustrated in FIGS. 22–24. While the embodiments discussed to this point all employ a concave plate, it should be appreciated that it is the difference in curvature between the plate and the vane which results in the sealing force of the vane being applied against the plate. For example, a convex plate 264 having a radius of 9 inches (230 mm) could be used in combination with a vane formed to have a permanent radius in a free or unloaded condition of 6 inches (150 mm). Fixing the curved vane to the convex plate results in the vane exerting a load against the pressure plate just like the loads exerted by vanes 12, 112 and 212 against plates 14, 114, and 214. Similarly, if the plate is flat, a curved vane could be used to achieve the desired sealing load, as long as the concave side of the vane is pressed against the plate. It is understood that the amount of curvature of the vane will vary with other parameters of the vane, such as the stiffness of the vane and the size and shape of the vane. What is common to each of the possible combinations of plate curvature and the free curvature of the vane is that the vane has a curvature distinct from the plate, and when the vane is pressed into conformance with the plate at the opening, the vane is forced to bend and thereby generate a sealing load around the opening in the plate.

Figure 25:
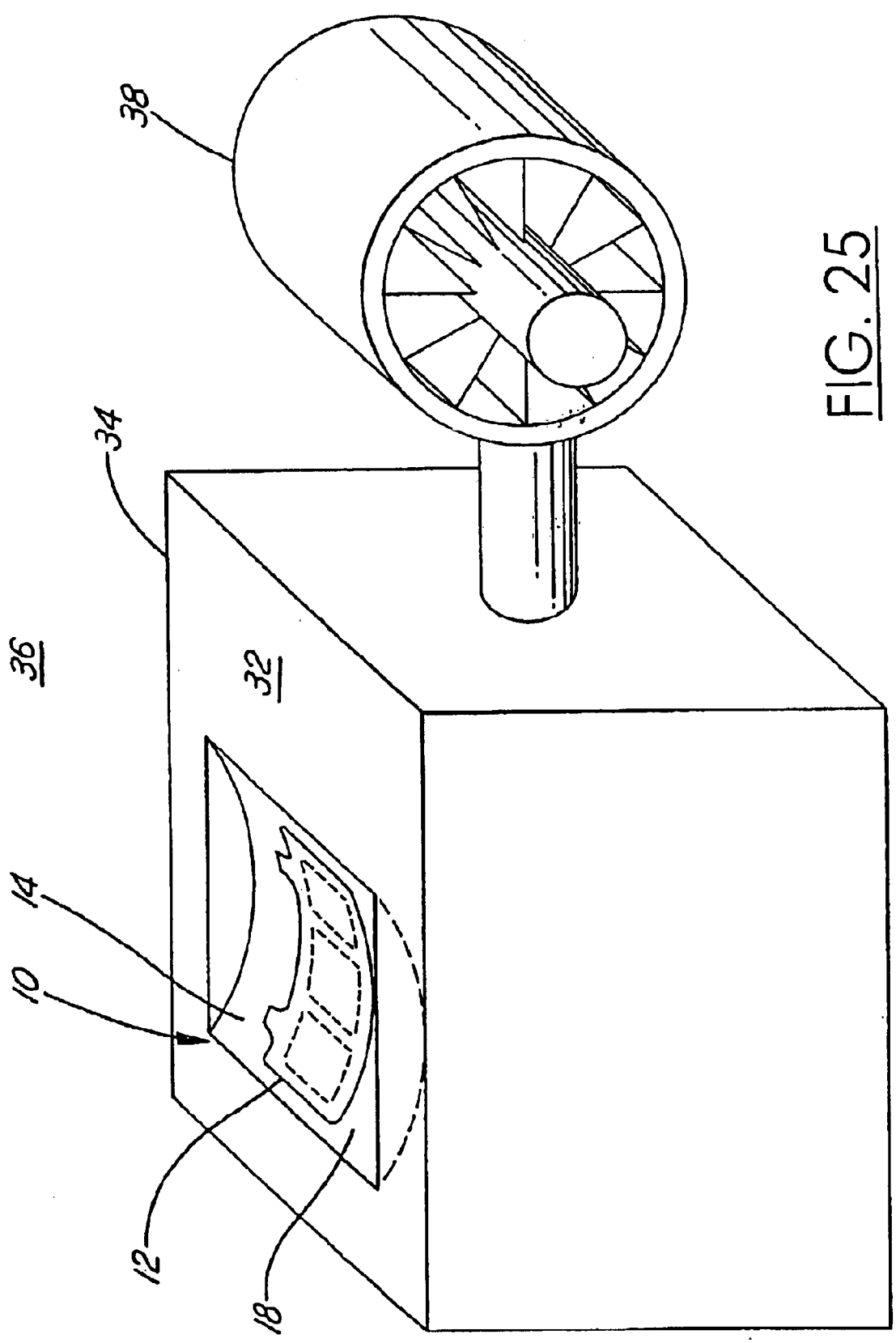
FIG. 25 is a schematic diagram of a system employing the inventive valve.

One example of the operation of the inventive valve 10 is shown in FIG. 25. Valve 10 is mounted as shown schematically in FIG. 25 to or formed in a surface 32 separating a first chamber 34 from a second region 36. It is desired to permit fluid to flow out of first chamber 34, to second region 36, and to block flow from second region 36 into first chamber 34. A source of fluid flowing from chamber 34 through valve 10 is a fan or pump 38. Fan 38 forces air into chamber 34 which exhausts through valve 10. One exemplary chamber is an automobile passenger cabin, with the outside environment constituting the second region. The fan of the heating, ventilating and air conditioning (HVAC) system corresponds to fan 38. Operation of the fan, in most operating modes of the HVAC system, forces air into the cabin which causes air in the cabin to be exhausted through valve 10. Another chamber and region combination is a furnace flue and the outside environment. Many other such applications are readily apparent. The vane side 18 of plate 14 is exposed to the environment, and the back side 24 of plate 14 is disposed toward the chamber.

When the pressures inside and outside the chamber are in equilibrium, vane 12 is held against plate 14 by the bending force of tabs 22. Both vane 12 and plate 14 preferably have a smooth finish to facilitate sealing therebetween. With pressure outside the chamber exceeding that inside the chamber, the fluid acts against vane 12, pressing it even more firmly against plate 14 than just the force of the tabs 22 alone.

Shifting the pressure balance so that the pressure inside the chamber is greater than outside causes the fluid to unseat vane 12. The fluid flows out of the chamber through valve 10, past vane 12. With the pressure in the chamber greater than the pressure outside by only a small amount, vane 12 deflects in the low pressure mode illustrated in FIGS. 3 and 4. With tabs 22 still resisting deflection, vane 12 deflects at the location furthest from tabs 22 which is the center of vane 12. Vane 12 curves away from plate 14. Fluid flows from the chamber, through the now open gaps between the sides of vane 12 and plate 14, as shown in FIG. 4, into the second region. When the pressure inside the chamber is increased to a predetermined level, the resistance of tabs 22 is overcome, and vane 22 swings open about a hinge axis or axes defined by tabs 22 as shown in FIGS. 5 and 6. The hinge axis or axes are normal to axis of curvature 16. Although not shown in FIGS. 5 or 6, vane 12 would likely retain its reverse bow shape when fully unseated from plate 14 because tabs 22 are too close to each other to allow vane 12 to assume a flat shape. When the pressure inside the chamber drops, the force induced by tabs 22 pivots vane 12 back into contact and conformance with plate 14.

The word curvature as used herein refers to surfaces that are flat as well as curved. The curvature of the plates and vanes may be thought of as being positive or negative to indicate whether it is a convex or concave surface and may have a magnitude indicator as well corresponding to a radius. A flat surface would be characterized as a curvature having a radius equal to infinity. Therefore, the term curvature is not exclusive of flat surfaces. Again, as noted above in the discussion of FIGS. 1–6 and 19–21, the curvature is not limited to constant radius curves The basic valve structure is suitable for many different types of valves. The vane material must be chosen to suit the application, the fluid to be controlled, temperature, pressure, environmental and flow requirements. It can function as a check valve in gas or liquid pumps, venting devices or systems, an anti-back flow valve for breathing devices, medical infusion systems, plumbing systems, clothes dryers, sanitary vents, range hood vents, building vents. The list is nearly endless.

The embodiments disclosed herein have been discussed for the purpose of familiarizing the reader with the novel aspects of the invention. Although preferred embodiments of the invention have been shown and disclosed, many changes, modifications and substitutions may be made by one having ordinary skill in the art without necessarily departing from the spirit and scope of the invention as described in the following claims.

We claim:

1. A one-way valve comprising:
    a plate having a vent opening of a first size and shape and the plate having a first curvature;
    a flexible vane having a second curvature distinct from the first curvature, the vane being fixed to the plate in a manner facilitating the movement of the vane between an open position and a closed position, the vane being in a bent condition in the closed position, the vane conforming to the first curvature of the plate over the vent opening and covering the vent opening in the closed position, the vane being elastic throughout a range of deflection between the closed position and the open position;
    at least one of the first curvature and the second curvature having an axis of curvature about which the one curvature is formed; and
    a hinge disposed on a side of the vane fixing the vane to the plate and enabling pivoting between the open position and the closed position about a hinge axis normal to the axis of curvature.

2. A one-way valve as claimed in claim 1 wherein the vane is formed of a material having a coefficient of thermal expansion substantially equal to the coefficient of thermal expansion of the plate.

3. A one-way valve as claimed in claim 2 wherein the vane is fixed to the plate by a tab serving as the hinge and extending from a side of the vane and the tab functions as a living hinge and further wherein the tab is fixed to the plate.

4. A one-way valve as claimed in claim 1 wherein the hinge is a tab extending from a side of the vane and the tab functions as a living hinge, and the tab engages only a portion of the side of the vane from which it extends.

5. A one-way valve as claimed in claim 4 wherein the tab is formed integral and unitary with the vane.

6. A one-way valve as claimed in claim 5 wherein two tabs extend from the side of the vane.

7. A one-way valve as claimed in claim 6 wherein the tabs are formed integral and unitary with the vane and the tabs cumulatively engage a portion of the side from which it extends totaling less than one half the width of the side.

8. A one-way valve as claimed in claim 1 wherein the vane is substantially the same shape and size as the opening in the plate.

9. A one-way valve as claimed in claim 8 wherein the vane is fixed to the plate by a tab serving as the hinge and extending from a side of the vane and the tab functions as a living hinge and further wherein the tab is fixed to the plate.

10. A one-way valve as claimed in claim 1 wherein the vent opening is a first vent opening and the hinge is a first hinge and the hinge axis is a first hinge axis and the plate has a second vent opening with each of the vent openings being a mirror image of the other across an imaginary plane extending between the two and the flexible vane is a first flexible vane and the valve has a second flexible vane in the mirror image of the first flexible vane disposed over the second opening and a second hinge is disposed on a side of the second vane most proximate to the first vane and enabling the pivoting of the second vane between the open position and the closed position about a second hinge axis, wherein the first hinge axis and the second hinge axis and the imaginary plane are substantially parallel to each other and positioned to allow the vanes to pivot toward each other when in the open position.

11. A one-way valve as claimed in claim 10 wherein the vanes and tabs are all formed integral and unitary with each other from a single piece of material.

12. A one-way valve as claimed in claim 11 wherein the tabs serve as living hinges.

13. A one-way valve comprising:
    a plate having a vent opening of a first size and shape and the plate having a first curvature;
    a flexible vane having a second curvature distinct from the first curvature, the vane being fixed to the plate in a manner facilitating the movement of the vane between an open position and a closed position, the vane being in a bent condition in the closed position, the vane conforming to the first curvature of the plate over the vent opening and covering the vent opening in the closed position, the vane being elastic throughout a range of deflection between the closed position and the open position;
    at least one of the first curvature and the second curvature having an axis of curvature about which the one curvature is formed; and
    a hinge disposed on a side of the vane fixing the vane to the plate and enabling pivoting between the open position and the closed position about a hinge axis normal to the axis of curvature;
    wherein the vane is formed of a material having a coefficient of thermal expansion substantially equal to the coefficient of thermal expansion of the plate and the vane is fixed to the plate by a tab serving as the hinge and extending from a side of the vane and the tab functions as a living hinge and further wherein the tab is slidably held against the plate by a restraining feature.

14. A one-way valve comprising:
    a plate having a vent opening of a first size and shape and the plate having a first curvature;
    a flexible vane having a second curvature distinct from the first curvature, the vane being fixed to the plate in a manner facilitating the movement of the vane between an open position and a closed position, the vane being in a bent condition in the closed position, the vane conforming to the first curvature of the plate over the vent opening and covering the vent opening in the closed position, the vane being elastic throughout a range of deflection between the closed position and the open position;
    at least one of the first curvature and the second curvature having an axis of curvature about which the one curvature is formed; and
    a hinge disposed on a side of the vane fixing the vane to the plate and enabling pivoting between the open position and the closed position about a hinge axis normal to the axis of curvature,
    wherein two tabs extend from the side of the vane and one of the tabs is fixed to the plate and a second of the tabs is displaceable relative to the plate permitting the vane to remain in engagement with the plate with relative thermal contraction and expansion of the vane relative to the plate.

15. A one-way valve comprising:
    a plate having a vent opening of a first size and shape and the plate having a first curvature;

a flexible vane having a second curvature distinct from the first curvature, the vane being fixed to the plate in a manner facilitating the movement of the vane between an open position and a closed position, the vane being in a bent condition in the closed position, the vane conforming to the first curvature of the plate over the vent opening and covering the vent opening in the closed position, the vane being elastic throughout a range of deflection between the closed position and the open position;

at least one of the first curvature and the second curvature having an axis of curvature about which the one curvature is formed; and a hinge disposed on a side of the vane fixing the vane to the plate and enabling pivoting between the open position and the closed position about a hinge axis normal to the axis of curvature, wherein two tabs extend from the side of the vane and are slidably held against the plate by a restraining feature to allow displacement of the vane relative to the plate permitting the vane to remain in engagement with the plate with relative thermal contraction and expansion of the vane relative to the plate.

16. A one-way valve comprising:

a plate having a vent opening of a first size and shape and the plate having a first curvature;

a flexible vane having a second curvature distinct from the first curvature, the vane being substantially the same shape and size as the opening in the plate, the vane being fixed to the plate in a manner facilitating the movement of the vane between an open position and a closed position, the vane being in a bent condition in the closed position, the vane conforming to the first curvature of the plate over the vent opening and covering the vent opening in the closed position, the vane being elastic throughout a range of deflection between the closed position and the open position;

at least one of the first curvature and the second curvature having an axis of curvature about which the one curvature is formed; and a hinge disposed on a side of the vane fixing the vane to the plate and enabling pivoting between the open position and the closed position about a hinge axis normal to the axis of curvature;

wherein the vane is fixed to the plate by a tab serving as the hinge and extending from a side of the vane and the tab functions as a living hinge and further wherein the tab is slidably held against the plate by a restraining feature.

17. A one-way valve comprising:

a plate having a vent opening of a first size and shape and the plate having a first curvature;

a flexible vane having a second curvature distinct from the first curvature, the vane being fixed to the plate in a manner facilitating the movement of the vane between an open position and a closed position, the vane being in a bent condition in the closed position, the vane conforming to the first curvature of the plate over the vent opening and covering the vent opening in the closed position, the vane being elastic throughout a range of deflection between the closed position and the open position;

at least one of the first curvature and the second curvature having an axis of curvature about which the one curvature is formed;

a hinge disposed on a side of the vane fixing the vane to the plate and enabling pivoting between the open position and the closed position about a hinge axis normal to the axis of curvature;

wherein the vent opening is a first vent opening and the hinge is a first hinge and the hinge axis is a first hinge axis and the plate has a second vent opening with each of the vent openings being a mirror image of the other across an imaginary plane extending between the two and the flexible vane is a first flexible vane and the valve has a second flexible vane in the mirror image of the first flexible vane disposed over the second opening and a second hinge is disposed on a side of the second vane most proximate to the first vane and enabling the pivoting of the second vane between the open position and the closed position about a second hinge axis, wherein the first hinge axis and the second hinge axis and the imaginary plane are substantially parallel to each other wherein the vanes are fixed to the plate by a tab serving as the hinge and extending from sides of the vanes most proximate to each other and further wherein the tab is fixed to the plate.

18. A one-way valve as claimed in claim 17 wherein the tabs and the vanes are formed integral and unitary with each other from a single piece of material.

19. A one-way valve as claimed in claim 17 wherein the vanes are fixed to the plate by a tab serving as the hinge and extending from sides of the vanes most proximate to each other and further wherein the tab is slidably held against the plate by a restraining feature.

20. A one-way valve comprising:

a plate having a vent opening of a first size and shape and the plate having a first curvature;

a flexible vane having a second curvature distinct from the first curvature, the vane being fixed to the plate by two tabs extending from a side of the vane, the first curvature is substantially parallel to an axis of curvature and a line through the tabs is approximately normal to the axis of curvature and the vane has a first dimension in a first direction normal to the axis of curvature and has a second dimension in a second direction parallel to the axis of curvature wherein the first dimension is larger than the second dimension, the tabs being disposed at least as close to the ends of the vane as to each other, the vane being in a bent condition in a closed position, the vane conforming to the first curvature of the plate over the vent opening and covering the vent opening in the closed position, the vane being elastic throughout a range of deflection between the closed position and an open position; and the tabs being formed integral and unitary with the vane wherein the tabs are a living hinge about which the vane pivots between the open position and the closed position and the tabs are sufficiently stiff to resist deflection at a first pressure level.

21. A one-way valve as claimed in claim 20 wherein the side of the vane to which the tabs extend is curved to be substantially complementary to the curvature of the plate, thereby substantially preventing deflection of the vane and relying on deflection of the hinges.

22. A one-way valve as claimed in claim 20 wherein the vent opening is a first vent opening and the plate has a second vent opening with each of the vent openings being a mirror image of the other across an imaginary plane extending between the two vent openings and the flexible vane is a first flexible vane and the tabs are first tabs and the valve has a second flexible vane in the mirror image of the first flexible vane disposed over the second opening the second flexible vane has second tabs integral and unitary with the first tabs and the second vane, and the first tabs and the second tabs connected to a portion of the plate intermediate both of the vent openings.

23. A one-way valve as claimed in claim 22 wherein the vanes have a first dimension in a first direction normal to the axis of curvature and have a second dimension in a second direction parallel to the axis of curvature wherein the first dimension is larger than the second dimension.

24. A one-way valve comprising:
a plate having a first vent opening of a first size and shape and a second vent opening of a second size and shape and the plate having a first curvature;
a first flexible vane disposed over the first vent opening and a second flexible vane disposed over the second vent opening, the vanes having a second curvature distinct from the first curvature, the first vane having first tabs extending from a side of the first vane with the second vane having second tabs extending from a side of the second vane, the first tabs being integral and unitary with the second tabs, the vanes being fixed to the plate by the first tabs and the second tabs and connected to a portion of the plate intermediate of both the vent openings, the tabs being disposed at least as close to ends of the first and second vanes as to each other, the first and second vanes being in a bent condition in a closed position, the first vane covering the first vent opening in the closed position and the second vane covering the second vent opening in the closed position, the vanes conforming to the first curvature of the plate over the vent openings and covering the vent openings in the closed position, the vanes being elastic throughout a range of deflection between the closed position and an open position; and
the tabs being formed integral and unitary with the vanes wherein the tabs are a living hinge about which the vanes pivot between the open position and the closed position and the tabs are sufficiently stiff to resist deflection at a first pressure level.

25. A one-way valve as claimed in claim 24 wherein the first curvature is substantially parallel to an axis of curvature and a line through the tabs is approximately normal to the axis of curvature.

26. A one-way valve comprising:
a concave plate having a vent opening of a first size and shape;
a flexible vane having a second size and shape and the vane having a substantially flat shape in a free state, the vane covering the vent opening in the closed position, the vane being sufficiently flexible that it conforms to a curvature of the plate in a closed position and the vane being elastic throughout a range of deflection between the closed position and the open position and the vane being sufficiently stiff to develop a desired sealing load when forced to conform to the concave plate; and
a hinge in the form of a tab extending from one side of the vane and fixed to the plate and the tab formed integral and unitary with the vane with the tab operating as a living hinge enabling pivoting of the hinge between an open position and a closed position, and the tab being smaller than the length of the side of the vane to which the tab is attached,
wherein the tab and the vane have associated bending stiffnesses such that the tab resists deflection and a portion of the vane distal to the tab deflects away from the plate and a portion of the vane proximate to the tab remains proximate to the plate responsive to a first pressure level and further wherein the tab deflects and the vane pivots about the hinge axis to the open position responsive to a second pressure level.

27. A one-way valve as claimed in claim 26 wherein the vent opening is a first vent opening and the plate has a second vent opening of a second size and shape and the flexible vane is a first flexible vane and the tabs are first tabs and the valve has a second flexible vane of a second size and shape disposed over the second opening, the second flexible vane has second tabs integral and unitary with the first tabs and the second vane, and the first tabs and the second tabs are connected to a portion of the plate intermediate both of the vent openings.

28. A one-way valve comprising:
a plate having a vent opening of a first size and shape and the plate having a first variable curvature;
a flexible vane having a second variable curvature distinct from the first variable curvature, the vane being fixed to the plate by two tabs extending from a side of the vane, the tabs being disposed at least as close to the ends of the vane as to each other, the vane being in a bent condition in a closed position, the vane conforming to the first variable curvature of the plate over the vent opening and covering the vent opening in the closed position, the vane being elastic throughout a range of deflection between the closed position and an open position; and
the tabs being formed integral and unitary with the vane wherein the tabs are a living hinge about which the vane pivots between the open position and the closed position and the tabs are sufficiently stiff to resist deflection at a first pressure level
wherein at least one of the first variable curvature and the second variable curvature has an axis of curvature about which the one curvature is formed and the first variable curvature has a changing radius of curvature along an imaginary plane perpendicular to the axis of curvature and a line through the tabs is approximately normal to the axis of curvature.

29. A one-way valve as claimed in claim 28 wherein the vane has a first dimension in a first direction normal to the axis of curvature and has a second dimension in a second direction parallel to the axis of curvature wherein the first dimension is larger than the second dimension.

30. A one-way valve as claimed in claim 29 wherein the side of the vane to which the tabs extend is curved to be substantially complementary to the curvature of the plate, thereby substantially preventing deflection of the vane and relying on deflection of the hinges.

31. A one-way valve as claimed in claim 28 wherein the vent opening is a first vent opening and the plate has a second vent opening with each of the vent openings being a mirror image of the other across an imaginary plane extending between the two vent openings and the flexible vane is a first flexible vane and the tabs are first tabs and the valve has a second flexible vane in the mirror image of the first flexible vane disposed over the second opening the second flexible vane has second tabs integral and unitary with the first tabs and the second vane, and the first tabs and the second tabs connected to a portion of the plate intermediate both of the vent openings.

32. A one-way valve as claimed in claim 31 wherein the vanes have a first dimension in a first direction normal to the axis of curvature and have a second dimension in a second direction parallel to the axis of curvature wherein the first dimension is larger than the second dimension.

33. A one-way valve as claimed in claim 31 wherein the side of each vane from which the tabs extend is curved to be substantially complementary to the curvature of the plate, thereby substantially preventing deflection of the vane and relying on the deflection of the hinges.

34. A one-way valve as claimed in claim 28 wherein the vane is formed of a material having a coefficient of thermal expansion substantially equal to the coefficient of thermal expansion of the plate.

35. A one-way valve as claimed in claim 28 wherein the vane is substantially the same shape and size as the opening in the plate.

36. A one-way valve as claimed in claim 28 wherein a first of the tabs is fixed to the plate and a second of the tabs is slidably held against the plate by a restraining feature which permits the second tab to remain in engagement with the plate.

37. A one-way valve comprising:

a plate having a vent opening of a first size and shape and the plate having a variable curvature and the variable curvature is substantially convex about a center axis of curvature;

a flexible vane having a second size and shape and the vane having a substantially flat shape in a free state, the vane covering the vent opening in a closed position, the vane being sufficiently flexible that it conforms to a curvature of the plate in the closed position and the vane being sufficiently stiff to develop a desired sealing load when forced to conform to the plate; and a hinge in the form of a tab extending from one side of the vane and fixed to the plate and the tab formed integral and unitary with the vane with the tab operating as a living hinge enabling pivoting of the hinge between an open position and a closed position, and the tab being smaller than the length of the side of the vane to which the tab is attached, wherein the tab and the vane have associated bending stiffnesses such that the tab deflects and a portion of the vane distal to the tab deflects away from the plate and a portion of the vane proximate to the tab remains in contact with the plate responsive to a first pressure level, and the associated bending stiffnesses prevent further deflection of the vane responsive to a second pressure level greater than the first pressure level.

38. A one-way valve as claimed in claim 37 wherein a restraining feature prevents further deflection of the vane responsive to a second pressure level greater than the first pressure level.

39. A one-way valve as claimed in claim 38 wherein the plate is configured with the restraining feature located on a plurality of the sides of the vane.

40. A one-way valve as claimed in claim 38 wherein the restraining feature is proximate to a portion of the surface of the vane on the surface side of the vane not in contact with the plate.

41. A one-way valve comprising:

a plate having a vent opening of a first size and shape and the plate having a variable curvature substantially convex about a center axis of curvature;

a flexible vane having a second size and shape and the vane having a substantially flat shape in a free state, the vane covering the vent opening in a closed position, the vane being sufficiently flexible that it conforms to a curvature of the plate in the closed position and the vane being sufficiently stiff to develop a desired sealing load when forced to conform to the plate; and a hinge in the form of a tab extending from one side of the vane and fixed to the plate and the tab formed integral and unitary with the vane with the tab operating as a living hinge enabling pivoting of the hinge between an open position and a closed position, and the tab being smaller than the length of the side of the vane to which the tab is attached, wherein the tab and the vane have associated bending stiffnesses such that the tab resists deflection responsive to a first pressure level, and further wherein the tab deflects and a portion of the vane distal to the tab deflects away from the plate and a portion of the vane proximate to the tab remains proximate to the plate responsive to a second pressure level.

42. A one-way valve comprising:

a plate having a vent opening of a first size and shape and the plate having a first curvature substantially parallel to an axis of curvature;

a flexible vane having a second curvature distinct from the first curvature, the vane being fixed to the plate by two tabs extending from a side of the vane and a line through the tabs is approximately normal to the axis of curvature, the tabs being disposed at least as close to the ends of the vane as to each other and are fixed to the plate, the vane being in a bent condition in a closed position, the vane conforming to the first curvature of the plate over the vent opening and covering the vent opening in the closed position, the vane being elastic throughout a range of deflection between the closed position and an open position; and the tabs being formed integral and unitary with the vane wherein the tabs are a living hinge about which the vane pivots between the open position and the closed position and the tabs are sufficiently stiff to resist deflection at a first pressure level.

43. The one-way valve of claim 42 wherein the tabs are slidably held against the plate by a restraining feature which permits the tabs to remain in engagement with the plate with relative thermal contraction and expansion of the vane relative to the plate.

* * * * *